March 30, 1943. R. FLOYD 2,314,931
FLY TRAP
Filed Oct. 13, 1942
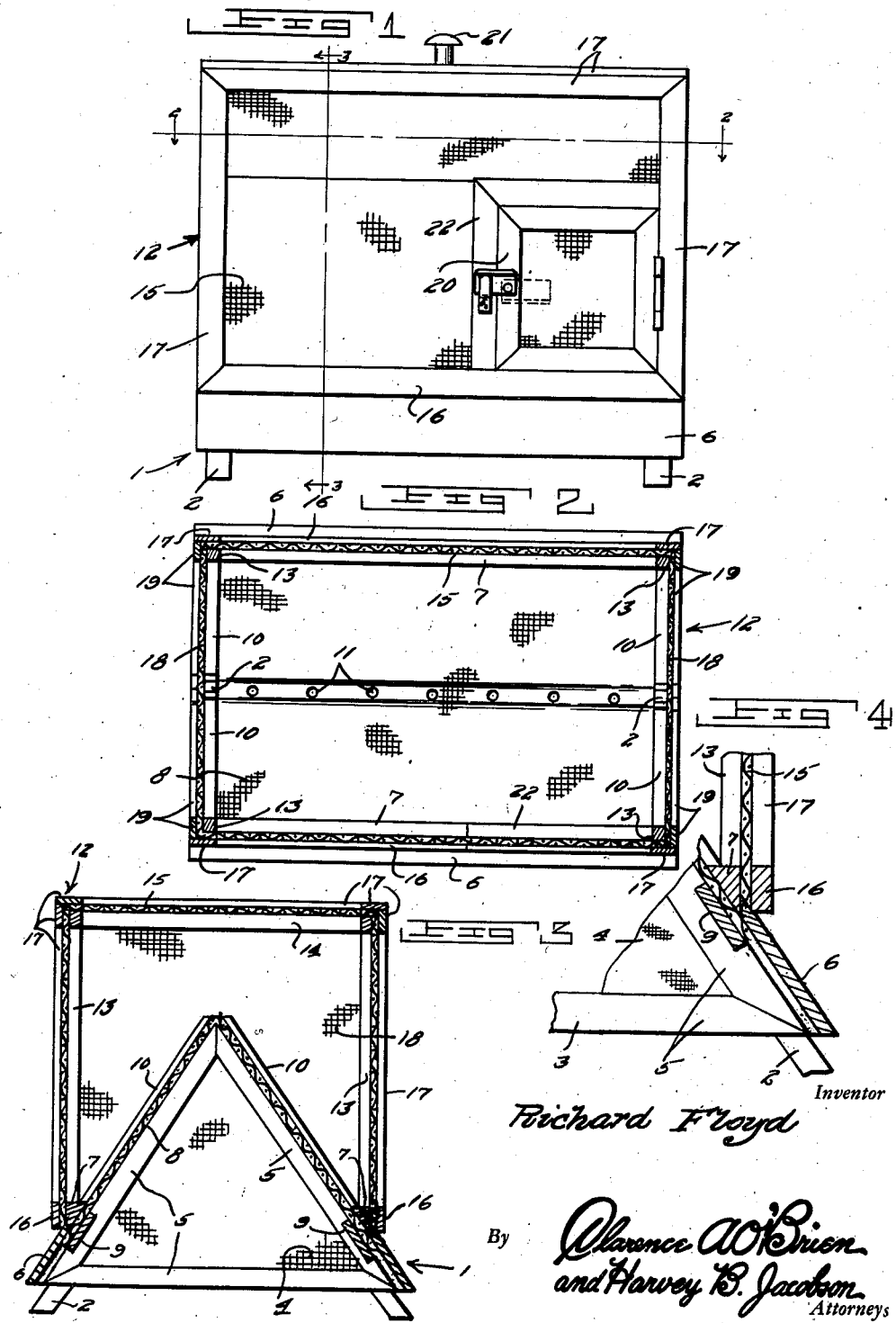
Inventor
Richard Floyd
By Clarence A. O'Brien
and Harvey B. Jacobson
Attorneys Patented Mar. 30, 1943

2,314,931

UNITED STATES PATENT OFFICE 2,314,931

FLYTRAP

Richard Floyd, Mount Vernon, Ind.

Application October 13, 1942, Serial No. 461,867

1 Claim. (Cl. 43—107)

The present invention relates to new and useful improvements in fly traps of the non-return entrance type, and has for its primary object to provide, in a manner as hereinafter set forth, a device of this character which is adapted to attract and imprison a large number of flies before it becomes necessary to empty the device.

Another very important object of the invention is to provide a fly trap of the aforementioned character comprising a frame of a novel construction and arrangement.

Other objects of the invention are to provide a fly trap of the character described which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in front elevation of a fly trap constructed in accordance with the present invention.

Figure 2 is a view in horizontal section, taken substantially on the line 2—2 of Figure 1.

Figure 3 is a cross-sectional view, taken substantially on the line 3—3 of Figure 1.

Figure 4 is a fragmentary view in vertical section and on an enlarged scale through a lower portion of the trap.

Referring now to the drawing in detail, it will be seen that the embodiment of the invention which has been illustrated comprises what may be considered a base structure 1. The base structure 1 includes inverted V-shaped side frames 2 between the lower portions of the legs of which braces 3 extend. Substantially triangular screens 4 are secured on the inner sides of the frames 2 by strips 5.

The base 1 further includes bars 6 which extend between the lower portions of the frames 2. Immediately above the members 6, bars 7 of substantially triangular cross-section extend between the frames 2. Mounted on the frames 2 is a screen 8 of inverted V-shaped cross-section. Certain of the marginal portions of the screen 8 are secured to the bars 6 and 7 by strips 9. Strips 10 secure the remaining marginal portions of the screen 8 on the frames 2. The ridge portion of the substantially V-shaped screen 8 has formed therein at spaced points a plurality of entrance openings 11.

Mounted on the base 1 is a cage 12 which is substantially rectangular in plan. The cage 12 includes corner posts 13 having mounted thereon top members 14. A screen 15 extends over the top members 14 and has its end portions secured by strips 16 to the substantially triangular bars 7 of the base 1. It will thus be seen that the screen 15 constitutes the front, back and top of the cage 12. Strips 17 secure the marginal side portions of the screen 15 to the members 13 and 14.

Side screens 18 are secured by strips 19 on the outer sides of the frames 2, the posts 13 and the side members 14. Access to the cage 12 is had through a hinged screen door 20 in the front of said cage. Rising from the top of the cage 12 is a lifting handle 21.

It is thought that the manner in which the trap functions will be readily apparent from a consideration of the foregoing. Briefly, the device may be placed over a suitable bait container. Or, if desired, the bait may be placed in the cage 12. The flies, after crawling under the base structure 1, rise and move upwardly on the oppositely inclined sides of the screen 8. Thus, the flies are directed toward the openings 11 through which they pass into the cage 12. The construction and arrangement is such that the flies, once imprisoned in the cage 12, will be very unlikely to find the openings 11 again and escape therethrough. A frame 22 is provided for the door 20 in the front of the frame 12.

It is believed that the many advantages of a fly trap constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

A fly trap comprising a base structure including a pair of inverted V-shaped side frames, braces extending between the lower portions of the legs of said frames, substantially triangular screens mounted on the inner sides of the frames and the braces, flat bars extending between the lower portions of the frames, bars of substantially triangular cross-section extending between the frames immediately above the first-named bars, a screen of inverted V-shaped cross-section mounted on the frames and having certain of its marginal portions secured to the inner sides of the first and second-named bars, the second-named screen having spaced entrance openings in its peak portion, and a foraminous cage mounted on the base structure, said cage including corner posts rising from the side frames, top members mounted horizontally on said posts, side screens secured to the posts, to the outer sides of the side frames and to certain of the top members, and a screen secured to the top members, the posts and to the outer sides of the second-named bars, the last-named screen constituting the front, back and top of the cage.

RICHARD FLOYD.